United States Patent
Thompson et al.

(10) Patent No.: US 9,358,966 B2
(45) Date of Patent: Jun. 7, 2016

(54) HYDRAULIC ACCUMULATOR PRE-CHARGE PRESSURE DETECTION FOR HYDRAULIC BRAKING SYSTEM

(71) Applicant: Caterpillar S.A.R.L., Geneva (SE)

(72) Inventors: Stephen Thompson, Sunderland (GB); Peter O'Brien, Sunderland (GB); Biagio Ciarla, Appleton, WI (US); Adam J. Adeeb, Plainfield, IL (US)

(73) Assignee: Caterpillar SARL, Geneva (CH)

( * ) Notice: Subject to any disclaimer, the term of this patent is extended or adjusted under 35 U.S.C. 154(b) by 73 days.

(21) Appl. No.: 14/499,333

(22) Filed: Sep. 29, 2014

(65) Prior Publication Data

US 2015/0097417 A1    Apr. 9, 2015

Related U.S. Application Data

(60) Provisional application No. 61/886,283, filed on Oct. 3, 2013.

(51) Int. Cl.
*B60T 13/14*   (2006.01)
*B60T 13/68*   (2006.01)
*B60T 13/66*   (2006.01)
*B60T 17/04*   (2006.01)

(52) U.S. Cl.
CPC ............... *B60T 13/14* (2013.01); *B60T 13/141* (2013.01); *B60T 13/662* (2013.01); *B60T 13/686* (2013.01); *B60T 17/04* (2013.01)

(58) Field of Classification Search
CPC ......... B60T 13/14; B60T 13/141; B60T 8/48; B60T 8/4872
USPC ........................... 303/10, 11, DIG. 11, 57, 80
See application file for complete search history.

(56) References Cited

U.S. PATENT DOCUMENTS

| | | | | |
|---|---|---|---|---|
| 6,132,010 A | * | 10/2000 | Holt | ..................... B60T 8/4045 303/11 |
| 2006/0055238 A1 | * | 3/2006 | Walker | ..................... B60K 6/12 303/152 |
| 2011/0264339 A1 | | 10/2011 | Wang et al. | |
| 2013/0145756 A1 | | 6/2013 | Otanez | |

FOREIGN PATENT DOCUMENTS

| | | |
|---|---|---|
| CN | 102493517 | 6/2012 |
| WO | 2013142541 | 9/2013 |

* cited by examiner

*Primary Examiner* — Melanie Torres Williams

(57) ABSTRACT

A system and method for detecting a pre-charge pressure of a hydraulic braking system are disclosed. A controller receives pressure readings from a pressure sensor indicative of the pressure of a hydraulic brake accumulator or the lower pressure of more than one accumulator. In response to fluid being provided to the hydraulic accumulator, the controller determines a first rate of pressure change, a second rate of pressure change different than the first rate, and a transition pressure between the first and second rates. The controller determines an approximate pre-charge pressure of the hydraulic brake accumulator based on the transition pressure. A warning can be provided to the operator or another when the determined pre-charge pressure is lower than a reference pressure.

20 Claims, 8 Drawing Sheets

HYDRAULIC ACCUMULATOR PRE-CHARGE PRESSURE DETECTION FOR HYDRAULIC BRAKING SYSTEM

CROSS-REFERENCE TO RELATED APPLICATIONS

This application claims the benefit of U.S. Provisional No. 61/886,283, filed Oct. 3, 2013.

TECHNICAL FIELD

The present disclosure relates to hydraulic accumulators and more particularly to determining pre-charge pressure of the hydraulic accumulator of a hydraulic system, such as a hydraulic braking and/or steering system.

BACKGROUND

Pre-charge pressure of a hydraulic accumulator needs to be periodically checked after installation in a hydraulic system to ensure operational health of the accumulator. Overtime, gas within accumulators can leak, primarily due to warn or degraded rubber diaphragms or seals that separate the gas and oil chambers within the accumulator. In some machines, hydraulic braking systems are provided that utilize gas filled accumulators which, when pressurized with fluid, allows the machine operator to apply the service brakes in the event of a primary braking system failure. Typical solutions for detecting the accumulator health involve connecting a gas pressure gauge and/or a modular kit to a gas valve of the hydraulic accumulator, when the machine is stopped and the fluid in the hydraulic accumulator is not pressurized or the accumulator is empty of fluid. The gas pressure gauge provides a reading of the pre-charge pressure. Depending on such readings, the hydraulic accumulator is either re-charged or completely overhauled or replaced. Hence, typical solutions required physically connecting the hydraulic accumulator to the pressure gauge. However, the accumulator can be located on a machine such that it is difficult to access and couple the gas pressure gauge.

In one example, German Patent Number DE102005052640 relates to a method involving determination of a difference in accumulator volume using a flow regulator with constant adjustable flow rate and an actuating valve with preset response time. The method also involves determination of pressure values before and after the fluid withdrawal from a hydraulic accumulator using a pressure sensor based on its recalled calculated accumulator volume at an empty state.

SUMMARY OF THE DISCLOSURE

In one embodiment, a hydraulic braking system includes one or more hydraulic brake accumulators capable of an associated pre-charge pressure. The hydraulic brake accumulator can discharge pressurized fluid to a hydraulic brake. A pressure sensor is fluidly coupled to the hydraulic brake accumulator. A pump can provide fluid to the hydraulic brake accumulator during a charge cycle. A controller is configured to receive pressure readings from the pressure sensor indicative of the pressure of the hydraulic brake accumulator. Further, in response to fluid being provided to the hydraulic accumulator, the controller is configured to determine a first rate of pressure change, a second rate of pressure change different than the first rate, and a pressure at a transition between the first and second rates. Further the controller is configured to determine an approximate pre-charge pressure of the hydraulic brake accumulator based on the transition pressure. The determined pre-charge pressure can be the difference of a pressure of fluid within a first chamber of the hydraulic brake accumulator during a minimum volume state and the transition pressure.

In another embodiment, a hydraulic braking system of a machine includes two hydraulic brake accumulators each capable of an associated pre-charge pressure. Each of the hydraulic brake accumulators can discharge pressurized fluid to corresponding hydraulic brakes of a machine. A pump can provide fluid to the hydraulic brake accumulators during a charge cycle. A shuttle valve is provided to fluidly couple a first line from the pump to a first accumulator line leading to one of brake accumulators and to a second accumulator line leading to the other of the brake accumulators. The shuttle valve is configured to fluidly couple one of the first and second accumulator lines with the lower pressure to the first line. A pressure sensor is fluidly coupled to the first line upstream of the shuttle valve. The pressure sensor is configured to indicate the lower pressure of the first and second accumulator lines. A controller is configured to receive pressure readings from the pressure sensor. In response to fluid being provided to one of the hydraulic accumulators, the controller is configured to determine a first rate of pressure change of said one of the hydraulic accumulators, a second rate of pressure change different than the first rate of said one of the hydraulic accumulators, and a transition pressure between the first and second rates of said one of the hydraulic accumulators. The controller is configured to determine an approximate pre-charge pressure of said one of the hydraulic brake accumulators based on the transition pressure.

In yet another embodiment, a method of detecting accumulator pre-charge pressure for a hydraulic braking system is also provided, including monitoring when a hydraulic brake accumulator of a hydraulic braking system of a machine is at a minimum volume state. The braking system can include more than one hydraulic brake accumulator and the monitoring step can be during an engine start up of the machine. A brake charge valve can be moved to initiate a charge cycle. Another step includes providing a pressurized fluid to the hydraulic brake accumulator, wherein a pressure of the fluid to the hydraulic brake accumulator changes at a first rate and transitions to a second rate at a transition pressure. Another step includes determining an approximate pre-charge pressure of the hydraulic brake accumulator based on the transition pressure. Another step may include communicating a warning when the determined pre-charge pressure is lower than a threshold.

Other features and aspects of this disclosure will be apparent from the following description and the accompanying drawings.

DETAILED DESCRIPTION

Figure 1:
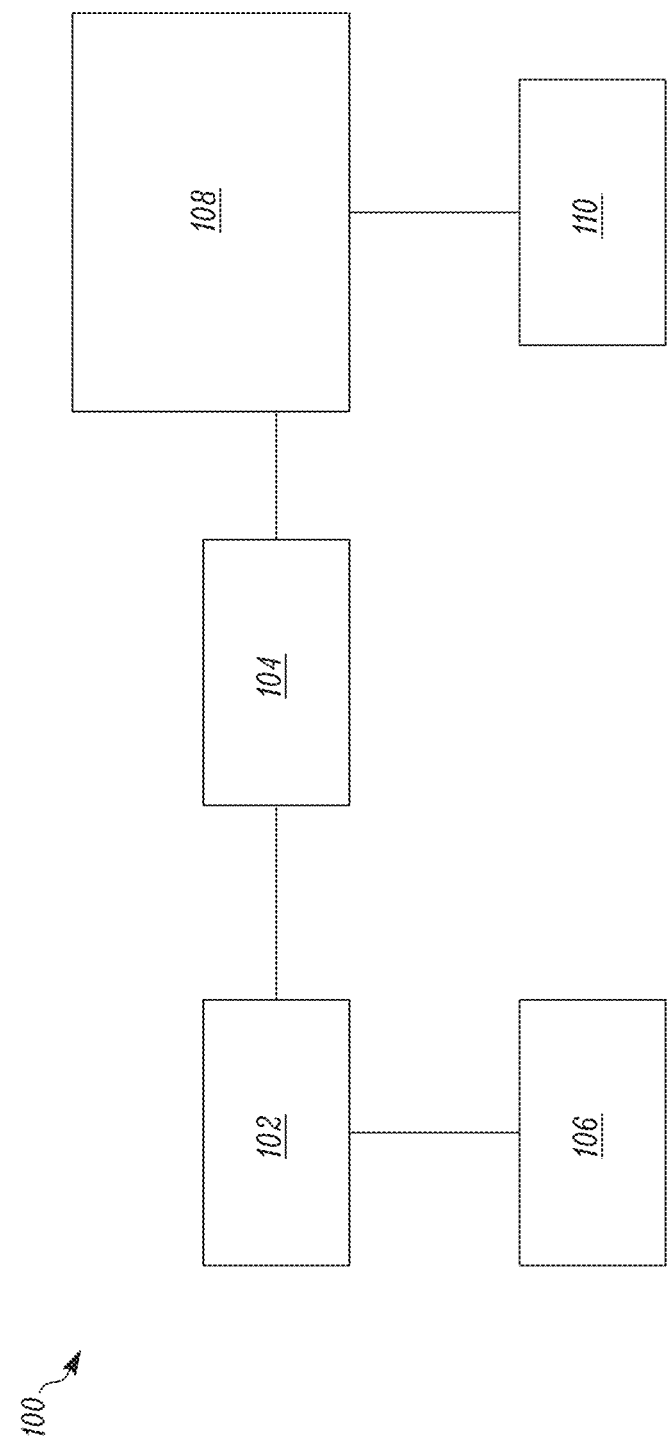
FIG. 1 is a block diagram of an exemplary system having a hydraulic accumulator and a controller, according to one embodiment of the disclosure.
Figure 2:
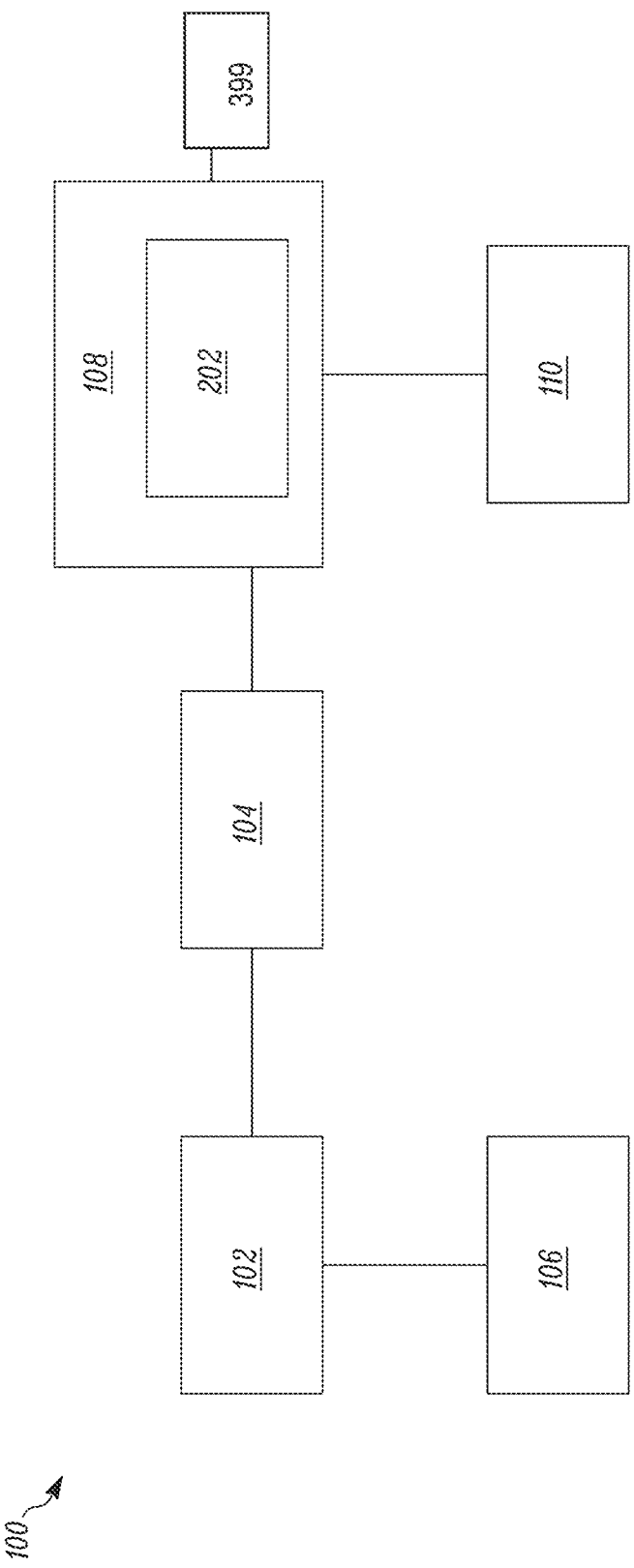
FIG. 2 is a block diagram of the system of FIG. 1 including a comparator.

FIGS. 1-2 illustrate an exemplary system 100 including a hydraulic accumulator 102, a pressure sensor 104, a fluid source 106 and a controller 108, according to one embodiment of the present disclosure. The system 100 may be embodied in any machine such as excavators, wheel loaders, tractors, large mining trucks, articulated trucks, and other machinery. The hydraulic accumulator 102 may be a piston-based accumulator or a bladder and diaphragm-based accumulator. One or more valves (not shown) may be associated with the system 100 to selectively control charging and discharging of the accumulator. For example, one or more valves may be open to permit charging and/or discharging of the accumulator, whereas one or more valves (same or different) may be closed to permit charging and/or discharging. In some circuits, the system may not include such valves.

Figure 3:
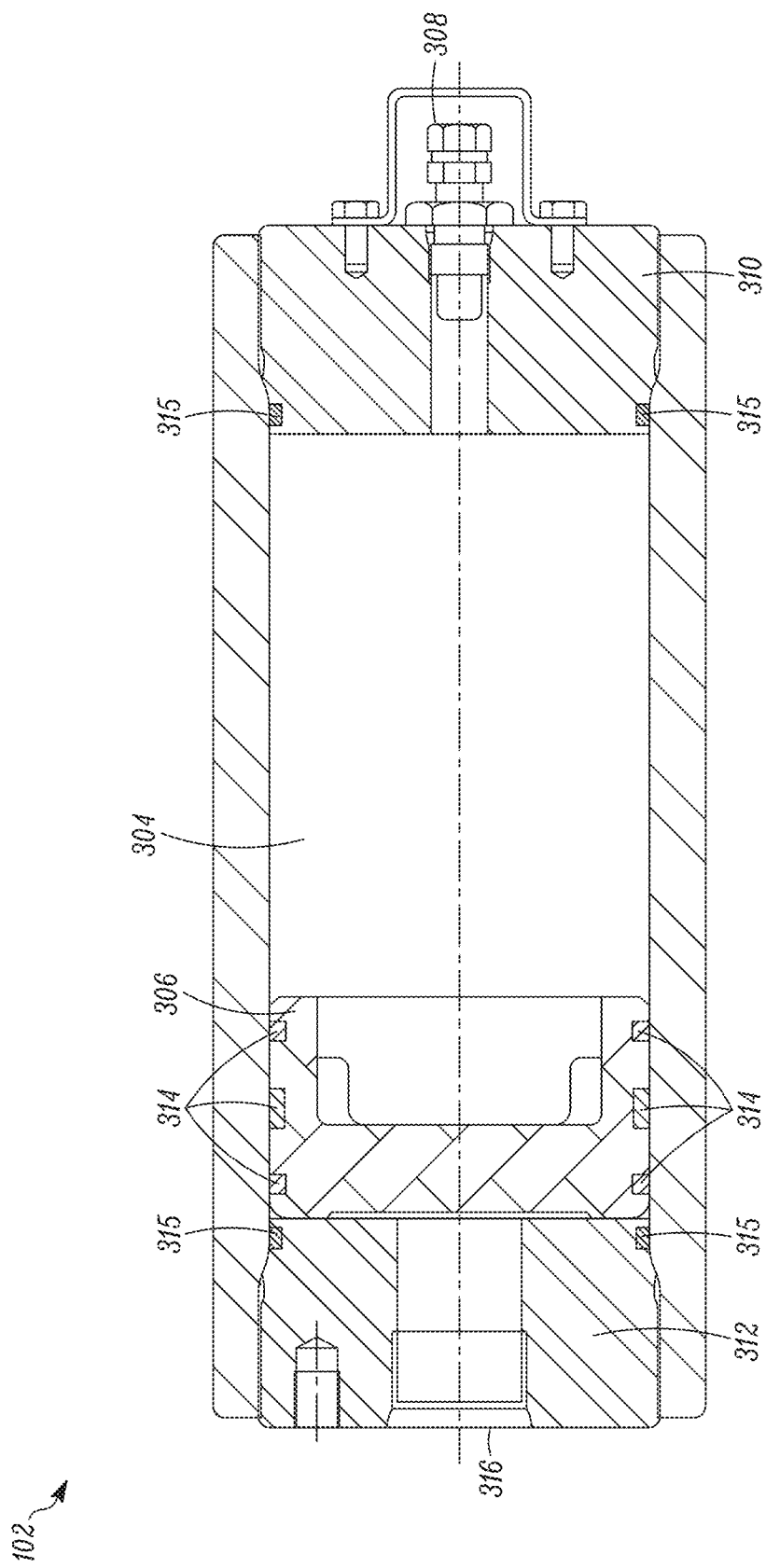
FIG. 3 is a diagrammatic view of the hydraulic accumulator in a minimum volume state.
Figure 4:
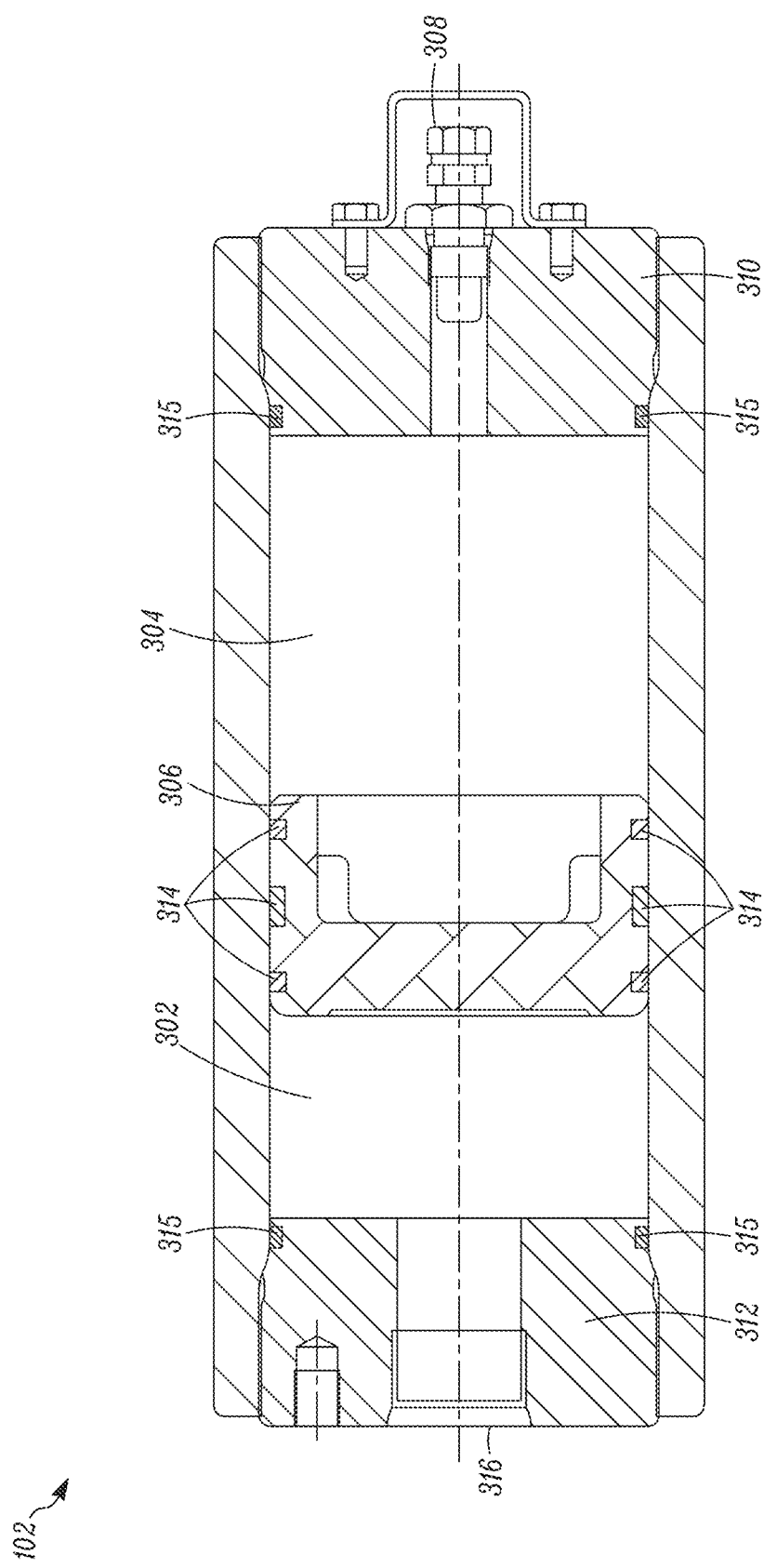
FIG. 4 is a diagrammatic view of the hydraulic accumulator at an intermediate state.
Figure 8:
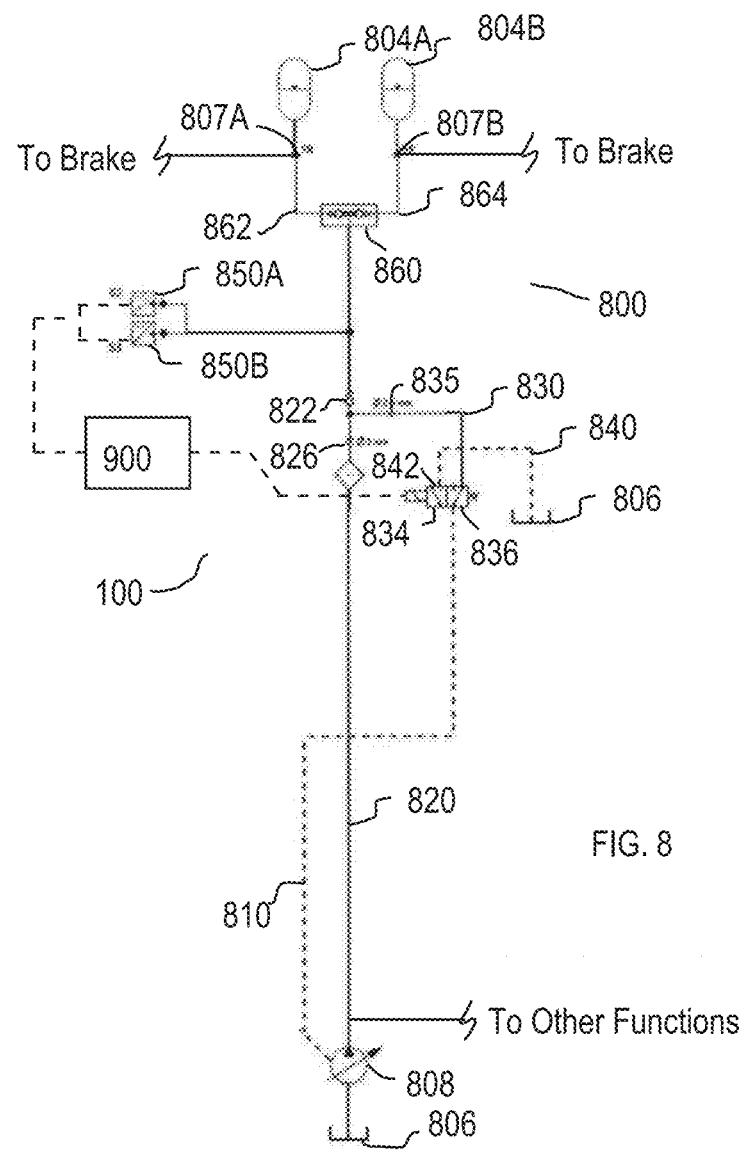
FIG. 8 is schematic of a hydraulic braking system.

The description of the hydraulic accumulator will reference accumulator 102, although the description would also apply to the hydraulic brake accumulators 804A, 804B in FIG. 8. As shown in FIGS. 3-4, the hydraulic accumulator 102 may include a first fluid chamber 302, such as a working fluid or oil chamber, a second fluid chamber 304, such as a compressible fluid or gas chamber, and a separator 306 disposed between the chambers 302, 304. The first fluid chamber 302 may be configured to be filled with a first fluid. In one embodiment, the first fluid may include oil, lubricating fluid, or any other fluid associated with hydraulic machinery. The second fluid chamber 304 of the hydraulic accumulator 102 may be filled with a gas or any other compressible fluid via a gas valve 308. In one embodiment, the gas may be nitrogen. The separator 306 of the hydraulic accumulator 102 may be configured to separate the first fluid and second fluid chambers 302, 304 to keep the fluid contained therein substantially isolated from one another.

The hydraulic accumulator 102 may include a first end cap 310 associated with the second fluid chamber 304 and a second end cap 312 associated with the first fluid chamber 302. The separator 306 may be a piston having one or more seals 314 to reduce the risk of fluid from one chamber entering into the other chamber. The piston-like separator 306 is movable within the hydraulic accumulator 102 to reduce or increase the volume of the respective fluid chambers. Additional seals 315 may be provided in the first end cap 310 and the second end cap 312 of the hydraulic accumulator 102. Similarly, in case of a bladder and diaphragm-based accumulators, the separator 306 may be flexible membrane or an expandable separator being movable between an expanded configuration and a compressible configuration. The hydraulic accumulator 102 is sized to have a pre-charge pressure capacity to pressurize accumulated fluid within the first fluid chamber 302, e.g., for energy recovery, which is sequentially released from the first fluid chamber 302 at the pressure associated with the charged pressure of the second fluid chamber 304. The pre-charge pressure can be determined by the pressure capacity and difference between the first and second fluid chambers 302, 304.

To determine the pressure associated with the hydraulic accumulator 102, the pressure sensor 104 may be connected upstream or downstream of the first fluid chamber 302 of the hydraulic accumulator 102. The pressure sensor 104 may be configured to monitor and provide to the controller 108 pressure readings of the fluid in the first fluid chamber 302 during charging and discharging of the hydraulic accumulator 102. In one embodiment, the pressure readings may either be provided continuously or after pre-determined intervals of time. In one example, the pressure sensor 104 can be a fluid or oil pressure sensor.

The first fluid chamber 302 of the hydraulic accumulator 102 can be connected to the fluid source 106, such as a fixed or variable displacement hydraulic pump. The first fluid chamber 302 of the hydraulic accumulator 102 is configured to receive and deliver fluid at a flow rate during accumulator charging and discharging modes, respectively. Parameters related to the pump such as flow rate, flow direction, and the like may vary. It should be understood that any other device which may regulate a flow of the fluid may also be utilized. One or more valves may be associated with the first fluid chamber 302 such that after discharging of the hydraulic accumulator 102, the valve is configured to prevent charging at specified periods.

As shown in FIGS. 1-2, the controller 108 may be connected to the pressure sensor 104. The controller 108 may be configured to receive and process the pressure readings taken by the pressure sensor 104. Moreover, the controller 108 may determine an approximate pre-charge pressure of the hydraulic accumulator 102. Also, the controller 108 may be configured to determine or estimate frictional forces associated with the separator 306 of the hydraulic accumulator 102. For example, determination of such frictional forces may be useful to determine the effectiveness of the seals 314 of a piston-based accumulator.

In one embodiment, as shown in FIG. 2, the controller 108 may include a comparator 202 to diagnose a health of the hydraulic accumulator 102. The comparator 202 may compare at least one of the pre-charge pressure, the frictional forces with a pre-determined threshold range of pre-charge pressure and the frictional forces associated with the hydraulic accumulator 102 to diagnose the health of the hydraulic accumulator 102. In another embodiment, the comparator 202 may be an independent or separate module connected to the controller 108 by known methods. The description of the controller and the comparator would also apply to the controller 900 in FIG. 8.

The controller 108 and/or comparator 202 may include a processor unit, input and output ports, an electronic storage medium for executable programs and threshold values, random access memory, a data bus, and the like. The functionality of the controller 108 and/or comparator 202 may further include other activities not described herein.

Also, the controller 108 and/or the comparator 202 may retrieve or store the pressure readings in a database 110. The database 110 may store historical data values related to the threshold range of pre-charge pressure and frictional forces of the hydraulic accumulator 102. The database 110 may utilize data structures, index files, or any other data storage and retrieval technique, without any limitation. It should be understood that the exemplary system 100 may include other components not described herein.

Figure 5:
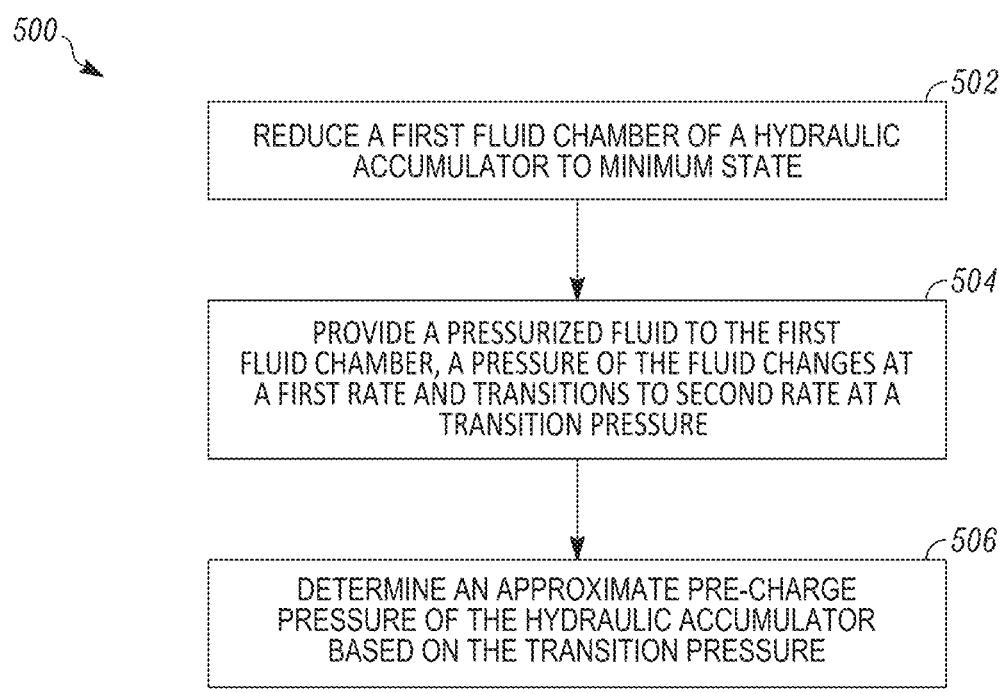
FIG. 5 is a process of determining an approximate pre-charge pressure of the hydraulic accumulator.
Figure 6:
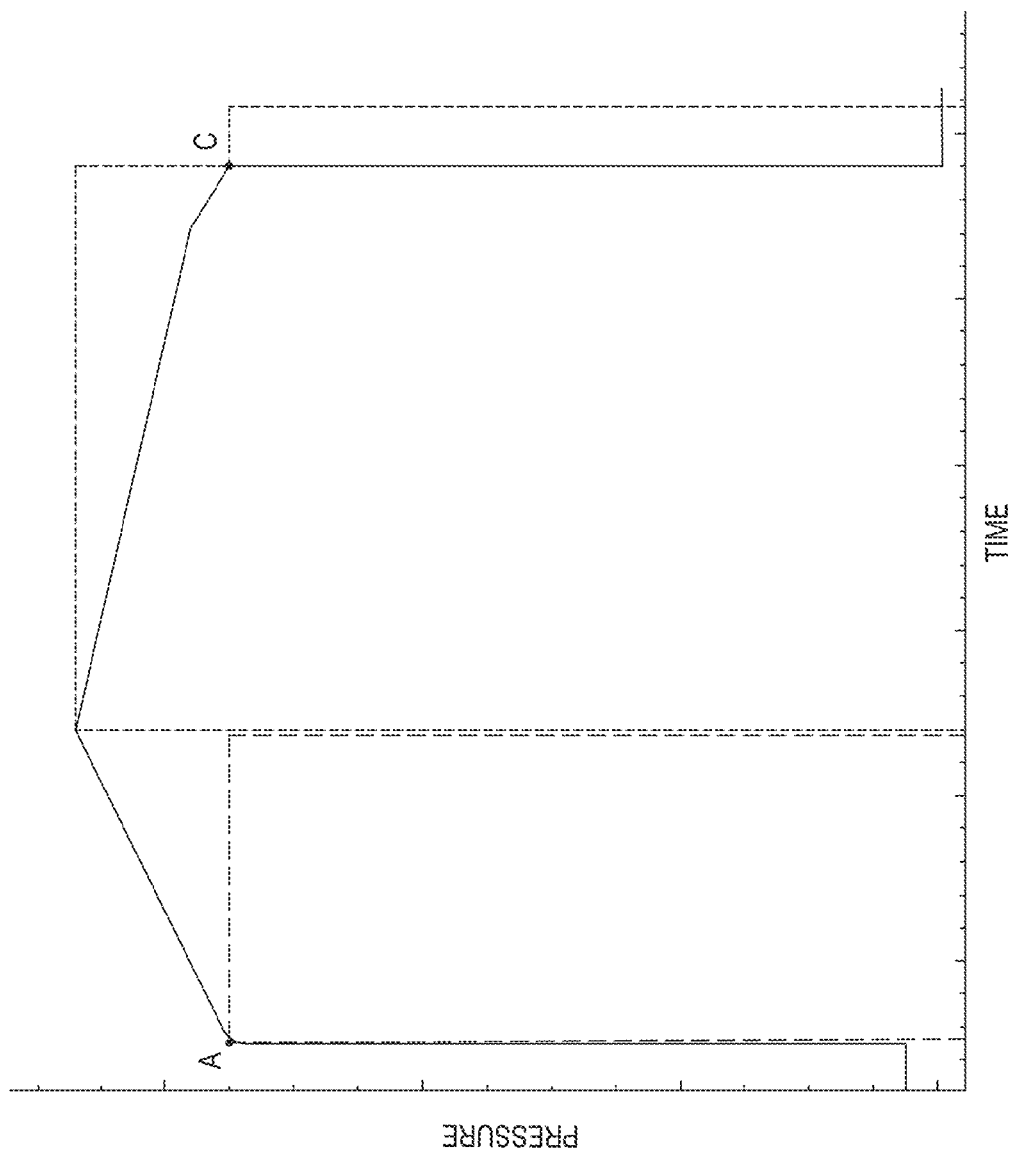
FIG. 6 is a graphical view of change in fluid pressure with respect to time during charging and discharging of the hydraulic accumulator.
Figure 7:
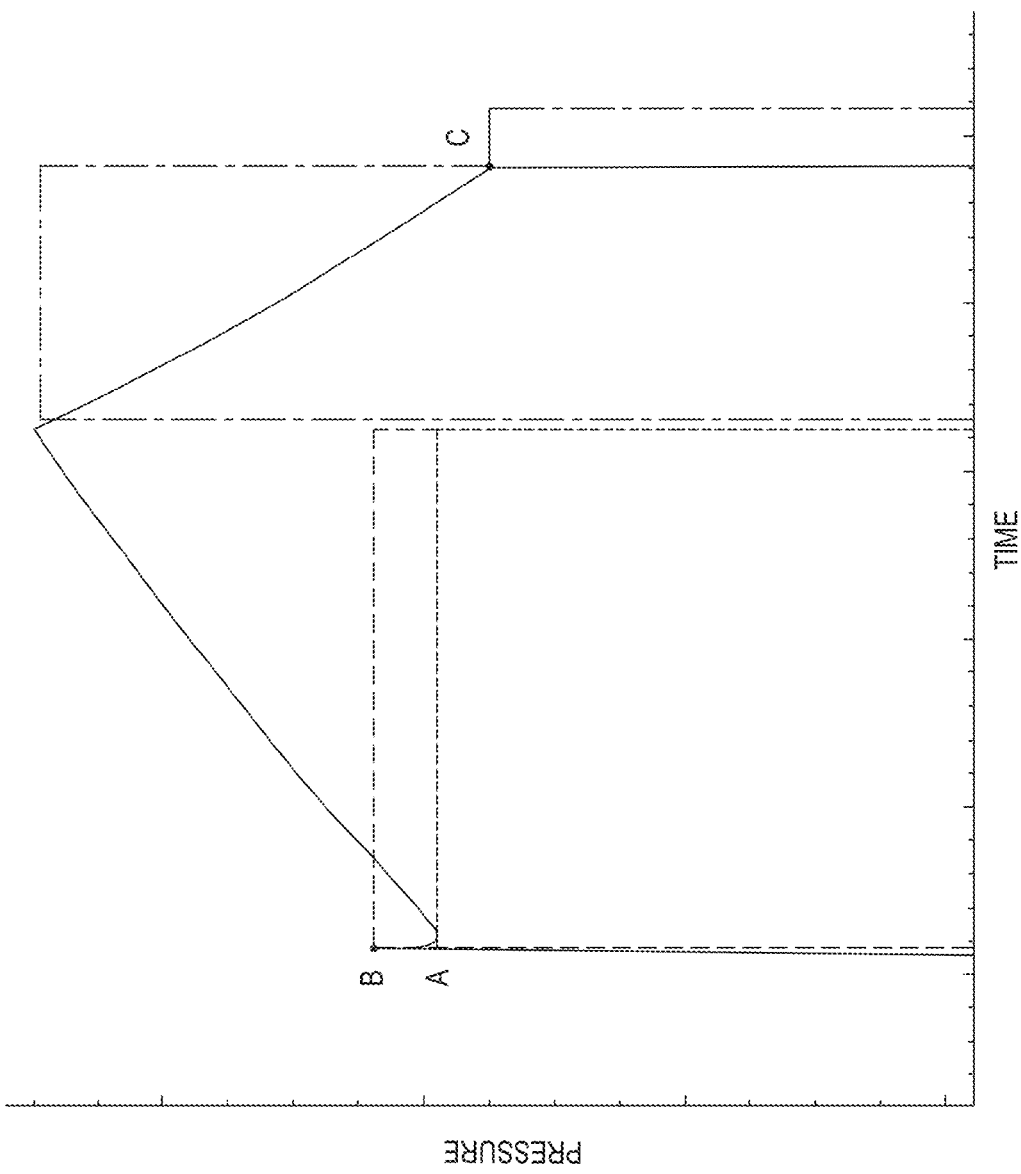
FIG. 7 is a graphical view of the change in fluid pressure with respect to time showing a peak pressure attained by the fluid pressure.

FIG. 5 illustrates a process for determining the pre-charge pressure of the hydraulic accumulator 102. FIGS. 6-7 are graphical views of the changes in the fluid pressure with respect to time, as monitored by the pressure sensor 104 which is connected to the hydraulic accumulator 102 during charging and discharging of the hydraulic accumulator 102.

The process and graphical views of FIGS. 5-7 would also apply to the hydraulic braking system in FIG. 8.

As mentioned before, the system 100 may be embodied in many type systems that include an accumulator. For example, in FIG. 8, the system 100 is provided with a hydraulic braking system 800. The accumulators can be used as energy storage devices to provide pressurized fluid to a hydraulic brake cylinder of a brake to permit operation of the brake for speed control of a machine. To this end, the accumulator is configured to be charged during a first operating state and to discharge during a second operating state to provide pressurized fluid to a hydraulic brake cylinder.

The hydraulic braking system 800 may include a fluid reservoir or tank 806, a fluid source or pump 808 adapted to pressurize fluid drawn from the tank 806 and supply to one or more accumulators, show as a first and second accumulator or a front brake accumulator 804A and a rear brake accumulator 804B, respectively, for storage thereof. In an exemplary embodiment, the tank 806 may constitute a low-pressure reservoir adapted to hold a supply of fluid. The fluid may include, for example, a hydraulic oil, a lubrication oil, or any other fluid known in the art. The pump 808 is in fluid communication with the front and rear brakes (not shown) via a front brake port 807A and a rear brake port 807B. A control valve (not shown) may be disposed between the brakes and the accumulator 804 and configured to selectively allow discharged pressurized fluid from the accumulator 804 into the brake cylinders (not shown) of the brakes.

In an embodiment, the pump 808 may be drivably connected to an output shaft of a power source, for example, by a counter shaft, a belt, an electric circuit, or in any other suitable manner. Alternatively, the pump 808 may be indirectly connected to the power source via a torque converter, a reduction gearbox, or in any other suitable manner. In an embodiment, the pump 808 embodies a variable displacement pump with load sensing capabilities (for example, as shown, with a load sense signal line 810), which permits the pump 808 to only operate or provide pressurized fluid flow when necessary. In another embodiment, the pump 808 may embody a fixed displacement pump.

During the first operating state to charge the accumulators 804A, 804B, the pump 808 provides pressurized fluid provided from the tank 806 to the accumulators 804A, 804B via a first line 820 fluidly coupled to the pump discharge. A check valve 822 may be included in the first line 820 having a threshold pressure setting and to facilitate unidirectional of flow. Upstream of the check valve 822 may be a first orifice 826. The first orifice 826 can be provided to ensure the charge rate of the accumulator is fixed or constant.

Branching from the first line 820 between the check valve 822 and the first orifice 826 is a second line 830 leading to a brake charge valve 834. A second orifice 835 can be provided in the second line 830. In one example, the second orifice 835 is sized to be smaller than the first orifice 826. The brake charge valve 834 may be a solenoid actuated valve capable of receiving a command signal from a controller 900. The brake charge valve 834 is movable between a first, on position (shown in FIG. 8) and a second, off position. A biasing member, such as a spring, can be provided to bias the brake charge valve in the first position. In the first position, the pressurized fluid from the second line 830 can communicate to the pump 808 via a first internal passageway 836 in the brake charge valve 834 and the load sense signal line 810. In the second position, the load sense signal line 810 can communicate with a drain signal line 840 via a second internal passage 842 formed in the brake charge valve 834 and the second line is blocked. The drain signal line 840 is fluidly coupled to the tank 806.

In one example, the first line 820 communicates with the accumulators 804A, 804B. In this arrangement, one or more pressure sensors, shown as a first pressure sensor 850A and a second pressure sensor 850B, are operatively coupled to the first line 820 upstream of the accumulators 804A, 804B and disposed downstream of the check valve 822. Only the first pressure sensor 850A may be provided, although the second pressure sensor 850B may be provided for redundancy and operated in the case the first pressure sensor 850A becomes inoperative.

In one example, when two accumulators are provided, the first line 820 may include an optional inverse shuttle valve 860. The inverse shuttle valve 860 includes a first accumulator line 862 and a second accumulator line 864 fluidly coupled to the respective accumulators 804A, 804B and the check valve 822. In one example, the pressure sensor can be provided upstream of the inverse shuttle valve 860 such that a single pressure sensor can be used to detect the pressures of the pair of accumulators. The inverse shuttle valve 860 is configured to hydraulically connect one of the first or second accumulator lines 862, 864 having the lower pressure to the first line 820.

To this end, the lower pressured accumulator can be in communication with the first line. The pressure sensor 850A can sense the pressure value of the lower pressure accumulator and communicate to the controller 900 via a pressure signal. The controller 900 is configured to process the pressure signal and compare the pressure signal to a predetermined threshold. When the pressure value is lower than the threshold, the controller can output a command signal to the brake charge valve 834 via the solenoid to allow movement to the first position. As a result, the pump 808 operatively increases its discharge pressure to eventually overcome the pressure setting of the check valve 822 through load sense signaling in order to charge the lower pressured accumulator with pressurized fluid.

As the lower pressured accumulator increases in pressure, the pressure sensor 850A can sense the pressure value of the lower pressure accumulator and communicate to the controller 900 via a pressure signal. The controller 900 is configured to process the pressure signal and compare the pressure signal to a predetermined threshold. When the pressure value is greater than the threshold, the controller can output a command signal to the brake charge valve 834 via the solenoid to allow movement to the second position. To this end, the load sense signal is communicated to the pump and the pump operatively decreases to off or a minimum pressure setting. As can be appreciated by those skilled in the art, the inverse shuttle valve will continuously move to the lower pressure accumulator of the two. Thus, the controller 900 will monitor the pressure of the accumulators and command charging of each accumulator. The braking accumulator pressure monitoring operation described herein can provide monitoring the accumulator pressure, and specifically, the state of the precharge pressure of the braking accumulators during machine operation, and in particular, during machine start up when the accumulators are initially empty.

Initially, the first fluid chamber 302 of the hydraulic accumulator 102 or 804A or 804B is connected to the fluid source 106. Fluid pressure may be driven to a minimum rate or zero such as, e.g., by withdrawing the fluid from the first fluid chamber 302 (that is, discharging fluid from the first fluid chamber 302) such that the hydraulic accumulator 102 is in a minimum volume state as shown in FIG. 3. In the case of machine startup, the accumulator may be empty such as for example the braking accumulators 804A, 804B. In the piston-based accumulator, at the minimum volume state, the separator 306 of the hydraulic accumulator 102 may be in contact with walls of the first fluid chamber 302. Hence, as shown in step 502, the first fluid chamber 302 may be reduced to a minimum or zero volume state, while the second fluid chamber 304 of the accumulator 102 or brake accumulator 804A or 804B may be at a maximum volume state. Here, the pressure readings of the fluid pressure of the first fluid chamber 302 at a minimum or zero volume may be monitored by the pressure sensor 104 or 850A.

The pre-charge pressure of the hydraulic accumulator 102 or 804A or 804B is defined as the pressure of the inert gas or compressible fluid filled in the second fluid chamber 304 when the hydraulic accumulator 102 or 804A or 804B is in the minimum volume state. As seen the accompanied graphs, the fluid pressure recorded by the pressure sensor 104 or 850A at the minimum volume state is zero.

Subsequently, at step 504, the hydraulic accumulator 102 or brake accumulator 804A or 804B may be charged by providing the fluid to the first fluid chamber 302. FIG. 4 illustrates an intermediate state of the hydraulic accumulator 102 or 804A or 804B during the charging or discharging cycle. During charging, the fluid is provided to the first fluid chamber 302 by the fluid source 106 or 808, at the pre-determined flow rate via a port 316 located near the first fluid chamber 302. In one embodiment, the pump may be driven to minimum or low flow such as, e.g., about 30 1pm or less. Substantially faster rates can be more difficult to measure and control due to temperature increase and other factors. The pressure readings of the fluid pressure may be simultaneously monitored by the pressure sensor 104 850A.

As the fluid is filled in the first fluid chamber 302, the separator 306 is pushed towards the second fluid chamber 304 of the hydraulic accumulator 102 or 804A or 804B. For a certain interval of time, the pressure of the fluid may continue to remain zero or minimal until the frictional forces associated with the separator 306 are overcome and the separator 306 begins to move away from the second end cap 312.

When the separator 306 starts moving, the volume associated with the first fluid chamber 302 increases as the fluid fills into the first fluid chamber 302, causing a corresponding decrease in the volume associated with the compressible fluid filled in the second fluid chamber 304. At this time, the pressure of the fluid may change at a first rate and then transition to a second rate (see FIGS. 6-7). It may be observed that the first rate of change in the fluid pressure with time is greater than the second rate of change in the fluid pressure with time, as seen in the rapid change to the first rate and subsequent gradual transitioning to the second rate in the accompanied graphs.

Moreover, a reading of a first transition pressure may be monitored and recorded by the controller 108 or 900. The first transition pressure of the fluid is the pressure at which the transitioning from the first to the second rate occurs. The second rate represents the charge rate of the accumulator when fluid is flowing into the accumulator. The first transition pressure is shown as Point A in the accompanied graphs. In one embodiment, the first transition pressure may be stored in the database 110 for retrieval. It should be noted that the associated pre-charge pressure of the hydraulic accumulator 102 or 804A or 804B may be the difference of a pressure of the fluid within the first fluid chamber 302 during the minimum volume state of the first fluid chamber 302 and the transition pressure. Alternatively, the pressure during the minimum volume state of the first fluid chamber may be approximately zero, and the pressure reading at the first transition pressure can represent the pre-charge pressure.

In another embodiment, a peak pressure of the fluid (shown as Point B in FIG. 7) during the charging of the hydraulic accumulator 102 or 804A or 804B, may be monitored and recorded by the controller 108 or 900. The peak pressure of the fluid is greater than the recorded first transition pressure. The peak pressure may also be stored in the database 110.

The peak pressure of the fluid may be corresponding to the a required pressure of the fluid needed to initiate a change in the minimum volume state of the hydraulic accumulator 102 or 804A or 804B, to overcome any frictional forces associated with moving the separator 306 towards the second fluid chamber 304. A person of ordinary skill in the art will appreciate that during charging of the hydraulic accumulator 102 or 804A or 804B from the minimum volume state, the fluid pressure may have to rise much higher to the peak pressure in order to overcome frictional forces and push the separator 306 towards the second fluid chamber 304. After the separator 306 begins to move, the fluid pressure may drop to the first transition pressure, as shown in FIG. 7.

The discharging of the hydraulic accumulator 102 or 804A or 804B may begin after a pre-determined pressure at the second rate is reached. Moreover, in one embodiment, the discharging may begin when a difference in pressure between the pre-determined pressure and the associated pre-charge pressure is 2 MPa. A person of ordinary skill in the art will appreciate that during charging of the hydraulic accumulator 102 or 804A or 804B, a difference between the fluid pressure (associated with the first fluid chamber 302) and a gas pressure (associated with the second fluid chamber 304) may exist such that the fluid pressure may be slightly higher than the gas pressure at any instant.

The hydraulic accumulator 102 or 804A or 804B may be discharged by withdrawing the fluid from the first fluid chamber 302. The fluid may be withdrawn at a pre-determined flow rate via the port 316. In one embodiment, the pre-determined flow rate may be about 30 1pm or less. In another embodiment, the rate of withdrawal of the fluid during discharging may be the same as the rate of filling of the fluid during charging of the hydraulic accumulator 102 or 804A or 804B.

During discharging of the hydraulic accumulator 102 or 804A or 804B, based on the readings provided by the pressure sensor 104, the behavior of the fluid pressure may be as depicted in the FIGS. 6-7. The pressure of the fluid may change at a third rate and then transition to a fourth rate. As is clear from the FIGS. 6-7, the third rate of change in the fluid pressure with time is slower or gradual as compared to a greater or rapid fourth rate of change with time.

The controller 108 or 900 may further monitor a second transition pressure (shown as Point C in FIGS. 6-7) at which the fluid pressure transitions from the third rate to the fourth rate. The second transition pressure may be stored in the database 110 by the controller 108 or 900. It should be understood that during the discharging of the hydraulic accumulator 102 or 804A or 804B, the difference between the fluid pressure and the gas pressure may be negligible. Also, after the hydraulic accumulator 102 or 804A or 804B is discharged, the fluid pressure may drop to zero while the gas pressure reaches the pre-charge pressure.

Subsequently, at step 506, the controller 108 or 900 may determine an approximate pre-charge pressure of the hydraulic accumulator 102 or brake accumulator 804A or 804B of a braking system based on the monitored transition pressure. In one embodiment, the determination may be based on the second transition pressure. In another embodiment, the determination of the approximate pre-charge pressure of the hydraulic accumulator 102 or 804A or 804B may be based on a co-relation of the first and second transition pressures.

The co-relation may include any mathematical function of the first and second transition pressure readings or the derivation of the approximate pre-charge pressure based on statistical analysis of the first and second transition pressure readings. In one embodiment, the controller 108 or 900 may calculate an average of the first and second transition pressures to determine the approximate pre-charge pressure of the hydraulic accumulator 102 or 804A or 804B.

It should be understood that the determined approximate pre-charge pressure may be substantially equivalent to the pressure of the hydraulic accumulator 102 or 804A or 804B at the minimum volume state. The rate of change of the gas pressure with time during charging and discharging of the hydraulic accumulator 102 or 804A or 804B may be proportional to the comparatively slower rate of change the fluid pressure with time recorded by the pressure sensor 104 or 850A. The slower rates may be easier to read and control.

Additionally, the controller 108 or 900 may determine the frictional forces associated with the separator 306, based on the monitored first, second, third and fourth rates. In yet another embodiment, the monitored first and second transition pressures, and the monitored first, second, third and fourth rates may be used to predict failure of the hydraulic accumulator 102 or 804A or 804B.

Further, the controller 108 or 900 may also determine the dynamic response of the hydraulic accumulator 102 or 804A or 804B. The controller 108 or 900 may retrieve from the database 110 and compare the peak pressure with the first transition pressure. Based on the comparison, the controller 108 or 900 may determine the dynamic response of the hydraulic accumulator 102 or 804A or 804B. In one embodiment, the difference in the peak pressure and the first transition pressure may be computed as the dynamic response of the hydraulic accumulator 102 or 804A or 804B.

Further, the comparator 202 may facilitate diagnosis of the health of the hydraulic accumulator 102 or 804A or 804B. The comparator 202 may retrieve from the database 110 one or more historical readings of the pre-charge pressure and/or the frictional forces associated with the hydraulic accumulator 102 or 804A or 804B. In one embodiment, the historical readings may be readings determined by the controller 108 or 900 or pre-determined threshold readings or reference pressures stored in the database 110. In another embodiment, the first transition pressure, peak pressure and the second transition pressure monitored may be compared to previous readings retrieved from the database 110, to determine a change in pre-charge pressure. For the piston based accumulator, the seal effectiveness may also be determined based on the comparison.

The controller 108 or 900 and/or comparator 202 may also be adapted to notify an operator if at least one of the determined pre-charge pressure and the frictional forces is not within the pre-determined threshold range. It should be understood that the notification may be provided to indicate that the determined approximate pre-charge pressure and/or the frictional forces of the hydraulic accumulator 102 may either be lower or higher than acceptable performance. For example, a notification can be provided when the pre-charge pressure is not above a pre-defined pressure, e.g., about 80 bar, for a pre-defined period of time, e.g., about four seconds, from the time when the brake charge is activated. For another example, a notification can be provided when the pressure climbs from empty to above a pre-defined maximum pressure within a very short time period, e.g., about 2.7 seconds, i.e., more quickly than an expected pre-defined period of time.

Moreover, the notification provided by the controller 108 or 900 and/or comparator 202 may be via an indicator 399 that is in communication with the controller 108 or 900 through wire or wireless communication as known in the art. The indicator 399 can be a display, gage, light signal, or the like configured for visual feedback like an alert message, and/or a speaker configured for audio feedback via like a warning alarm, and/or other devices known in the art to provide feedback. In addition to or instead of the operator, the warning may also be communicated to another such as a service technician or an operator supervisor. Based on the notification, one or more remedial actions such as re-charging of the hydraulic accumulator 102, overhauling of the hydraulic accumulator 102 or replacement of the seals 314 in case of the piston-based accumulator may be performed.

INDUSTRIAL APPLICABILITY

On usage, the hydraulic accumulator 102 or 804A or 804B may lose the pre-charge pressure due to a variety of reasons. For example, reasons may be component failure such as, e.g., piston seal failure in the piston-based accumulator or bladder failure in the bladder-based accumulator. Further, gain in pre-charge pressure can be attributed by leakage of fluid into the second fluid chamber 304. Accordingly, if the pre-charge pressure is too high or too low, then the hydraulic accumulator 102 may require servicing or overhauling. Hence, the health of the hydraulic accumulator 102 or 804A or 804B may require to be checked once every few months or at least once a year after installation in a machine.

Typical solutions included connecting a pressure gauge and/or a modular kit to the gas valve 308 of the hydraulic accumulator 102 or 804A or 804B.

However, establishing this physical connection of the pressure gauge to the gas valve 308 is problematic when the hydraulic accumulator 102 or 804A or 804B is installed in the machine due to reduced accessibility. Also, sometimes manual analysis of the readings may be required in order to determine whether the hydraulic accumulator 102 or 804A or 804B is functioning properly. This may result in an increased cost associated with measuring of the pre-charge using these typical solutions. The systems and methods described herein may relate to an automated process for monitoring and diagnosing the health of the hydraulic accumulator 102 or 804A or 804B, without requiring physical connection to the gas valve 308, i.e., without use of a gas gauge or sensor. The systems and methods described herein may determine and approximate pre-charge pressure and/or frictional values associated with the separator 306 of the hydraulic accumulator 102 or 804A or 804B to improve diagnosis of the accumulator health.

The diagnosis of the health and the determination of the approximate pre-charge pressure and/or the frictional values may be performed in real time by monitoring the pressure readings provided by the pressure sensor 104, and subsequently performing the necessary processing of the readings required for the determination.

The controller 108 or 900 may determine the approximate pre-charge of the hydraulic accumulator 102 or 804A or 804B based on the monitored transition pressure. In one embodiment, the dynamic response of the hydraulic accumulator 102 or 804A or 804B may be determined based on the difference between the peak pressure and the first transition pressure.

Also, in another embodiment, the controller or the comparator 202 may determine if the approximate pre-charge pressure determined by the controller 108 or 900 lies within the pre-determined threshold range. If the approximate precharge pressure is either too high or too low, that is, outside the range, then the operator may be suitably notified. Based on the notification, one or more remedial actions such as re-charging of the hydraulic accumulator 102 or 804A or 804B, replacement of the accumulator, or replacement of the seal may be performed. In one example, the controller operative to compare the pre-charge pressure with a pre-determined reference pressure associated with the hydraulic brake accumulator. In one example, the controller is configured to provide a warning and/or notification via an indicator coupled to the controller when the pre-charge pressure is less than pre-determined reference pressure.

In case of the piston-based accumulator, the systems and methods described herein may determine the seal effectiveness of the separator 306. If the determined frictional values of the separator 306 lie within the pre-determined threshold range it may be indicative that the seals of the hydraulic accumulator 102 are in an acceptable condition and the seals 314 may be retained. For example, loss in pre-charge pressure can be due to component failure such as piston seal failure or bladder failure such that fluid leakage occurs from the second fluid chamber to the first fluid chamber. Gain in pre-charge pressure can be due to fluid leakage from the first fluid chamber into the second fluid chamber.

The frictional values may also be compared to the previous threshold range to determine if current values are acceptable or not. Relatively high frictional values may be indicative of a failure of the hydraulic accumulator 102 in the future. Hence, the disclosure may assist in the determining if the frictional values of the hydraulic accumulator 102 are higher than desired at early stage before failure.

The method can be used to warn the operators of low braking accumulator pre-charge gas pressure. At an engine start up, the accumulator may be empty. The accumulator pre-charge gas pressure can be indicative of the accumulator pressure via the readings of the pressure sensor. If any pressure sensor is faulted at startup, the other pressure sensor can be used, when more than one pressure sensor is provided. An event time can be initiated when the necessary conditions are met from key on. From empty accumulators and once a charge event starts, the charge rate changes once the pressure reaches the lowest pre-charge pressure in any one of the accumulators. By monitoring the charge rate from empty to maxium charge pressure rate, the controller 108 or 900 is configured to identify the pressure at which the accumulator charge rate changes. This pressure is usually the lower accumulator pre-charge pressure. When the pre-charge gas pressure is lower than the threshold, a warning can be provided to the operator to indicate low pre-charge pressure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic braking system comprising:
   one or more hydraulic brake accumulators capable of an associated pre-charge pressure, the hydraulic brake accumulator to discharge pressurized fluid to a hydraulic brake;
   a pressure sensor fluidly coupled to the hydraulic brake accumulator;
   a pump to provide fluid to the hydraulic brake accumulator during a charge cycle; and
   a controller configured to receive pressure readings from the pressure sensor indicative of the pressure of the hydraulic brake accumulator, the controller configured to:
   in response to fluid being provided to the hydraulic accumulator, determine a first rate of pressure change, a second rate of pressure change different than the first rate, and a pressure at a transition between the first and second rates; and determine a pre-charge pressure of the hydraulic brake accumulator based on said pressure at the transition.

2. The system of claim 1, wherein the controller is operative to compare the pre-charge pressure with a pre-determined reference pressure associated with the hydraulic brake accumulator.

3. The system of claim 2, wherein the controller is configured to provide notification via an indicator coupled to the controller when the pre-charge pressure is less than pre-determined reference pressure.

4. The system of claim 1, wherein the one or more hydraulic brake accumulators is a front accumulator and a rear brake accumulator, the system further comprising an inverse shuttle valve fluidly coupling a first line from the pump to a first accumulator line leading to the front brake accumulator and to a second accumulator line leading to the rear brake accumulator.

5. The system of claim 4, further comprising a check valve disposed on the first line between the inverse shuttle valve and the pump.

6. The system of claim 5, further comprising a brake charge valve and a second line fluidly coupling the brake charge valve to the first line.

7. The system of claim 6, wherein the brake charge valve is movable between a first position and a second position, in the first position the brake charge valve includes a first internal passage for communication between the second line and a load sense signal line leading to the pump, and in the second position the brake charge valve is configured to block the second line and includes a second internal passage for communication between the load sense signal line and a tank.

8. The system of claim 7, wherein the controller is configured to communicate to the brake charge valve command signals for movement between the first position and the second position.

9. The system of claim 1, wherein the controller is configured to provide notification via an indicator coupled to the controller.

10. A hydraulic braking system of a machine comprising:
    a plurality of hydraulic brake accumulators capable of an associated pre-charge pressure, each of the hydraulic brake accumulators to discharge pressurized fluid to a corresponding hydraulic brake of a machine;
    a pump to provide fluid to the hydraulic brake accumulators during a charge cycle;
    a shuttle valve fluidly coupling a first line from the pump to a first accumulator line leading to one of brake accumulators and to a second accumulator line leading to the other of the brake accumulators, wherein the shuttle valve is configured to fluidly couple one of the first and second accumulator lines with the lower pressure to the first line;
    a pressure sensor fluidly coupled to the first line upstream of the shuttle valve, the pressure sensor configured to indicate the lower pressure of the first and second accumulator lines; and a controller configured to:
receive pressure readings from the pressure sensor
in response to fluid being provided to one of the hydraulic accumulators, determine a first rate of pressure change of said one of the hydraulic accumulators, a second rate of pressure change different than the first rate of said one of the hydraulic accumulators, and a transition pressure between the first and second rates of said one of the hydraulic accumulators; and
determine a pre-charge pressure of said one of the hydraulic brake accumulators based on the transition pressure.

11. The system of claim 10, wherein the controller is operative to compare the pre-charge pressure with a pre-determined reference pressure associated with the hydraulic brake accumulator, and the controller is configured to provide notification via an indicator coupled to the controller when the pre-charge pressure is less than pre-determined reference pressure.

12. The system of claim 11, further comprising a check valve disposed on the first line between the shuttle valve and the pump.

13. The system of claim 12, further comprising a brake charge valve and a second line fluidly coupling the brake charge valve to the first line upstream of the check valve.

14. The system of claim 13, wherein the controller is configured to communicate to the brake charge valve command signals for movement between a first position and a second position.

15. The system of claim 14, wherein in the first position the brake charge valve includes a first internal passage for communication between the second line and a load sense signal line leading to the pump, and in the second position the brake charge valve is configured to block the second line and includes a second internal passage for communication between the load sense signal line and a tank.

16. A method of detecting accumulator pre-charge pressure for a hydraulic braking system, comprising:
monitoring when a hydraulic brake accumulator of a hydraulic braking system is at a minimum volume state;
moving a brake charge valve to a position to initiate a charge cycle for the hydraulic system;
providing a pressurized fluid to the hydraulic brake accumulator during the charge cycle;
monitoring a pressure of the fluid to the hydraulic brake accumulator transitioning from a first rate to a second rate at a transition pressure; and
determining a pre-charge pressure of the hydraulic brake accumulator based on the transition pressure.

17. The method of claim 16, wherein the monitoring step includes monitoring when a plurality of hydraulic brake accumulators are at a minimum volume state during an engine start up of the machine.

18. The method of claim 16, further comprising providing a warning via an indicator when the pre-charge pressure is lower than a threshold.

19. The method of claim 16, further comprising providing a notification via an indicator when the pre-charge pressure is not above a pre-defined pressure for a pre-defined period of time.

20. The method of claim 16, further comprising providing a notification via an indicator when the pre-charge pressure is above a pre-defined pressure more quickly than an expected pre-defined period of time.

* * * * *